United States Patent [19]

Abura et al.

[11] Patent Number: 4,743,735

[45] Date of Patent: May 10, 1988

[54] ELECTRIC HAIR CURLER WITH DETACHABLE HANDLE CONTAINING RECHARGEABLE BATTERIES AND CHARGER

[75] Inventors: Yoshinori Abura; Eiji Tsuji; Kenji Okuyama; Shuhei Ochi, all of Hikone, Japan

[73] Assignee: Matsushita Electric Works, Ltd., Japan

[21] Appl. No.: 885,837

[22] Filed: Jul. 15, 1986

Related U.S. Application Data

[62] Division of Ser. No. 697,934, Feb. 4, 1985, Pat. No. 4,641,010.

[30] Foreign Application Priority Data

Feb. 15, 1984 [JP] Japan .................................. 59-26518

[51] Int. Cl.4 ....................... H05B 3/00; H01M 10/46; A45D 1/04; A45D 2/36

[52] U.S. Cl. ................................. 219/222; 132/11 R; 132/33 R; 132/37 R; 219/225; 219/230; 219/240; 219/533; 320/2

[58] Field of Search ................................ 219/222–226, 219/230, 240, 241, 533; 132/31 R, 32 R, 37 R, 37 A, 33 R, 11 A, 11 R; 320/2

[56] References Cited

U.S. PATENT DOCUMENTS

| | | | |
|---|---|---|---|
| Re. 30,618 | 5/1981 | Van Dyck et al. | 219/225 |
| 2,963,573 | 12/1960 | Ziegenbein | 320/2 X |
| 3,027,507 | 3/1962 | Hubner | 320/2 |
| 3,120,632 | 2/1964 | Hopt et al. | 320/2 |
| 3,275,819 | 9/1966 | Laurent | 320/2 X |
| 3,281,636 | 10/1966 | Fleckenstein et al. | 320/2 |
| 3,461,874 | 8/1969 | Martinez | 219/240 X |
| 3,533,397 | 10/1970 | Scher | 219/240 X |
| 3,603,765 | 9/1971 | Underwood | 219/222 |
| 3,859,497 | 1/1975 | McNair | 219/225 |
| 4,064,447 | 12/1977 | Edgell et al. | 320/2 |
| 4,191,917 | 3/1980 | Brown et al. | 320/2 |
| 4,227,541 | 10/1980 | Satchell | 132/37 R |
| 4,354,092 | 10/1982 | Manabe et al. | 219/225 |
| 4,467,263 | 8/1984 | Conforti et al. | 320/2 |

FOREIGN PATENT DOCUMENTS

| | | | |
|---|---|---|---|
| 1553082 | 12/1968 | France . | |
| 61272 | 4/1982 | Japan | 320/2 |
| 72277 | 5/1982 | Japan | 320/2 |
| 1153100 | 5/1969 | United Kingdom | 219/240 |
| 1185558 | 3/1970 | United Kingdom | 219/240 |
| 2021943 | 12/1979 | United Kingdom | 219/222 |
| 2032271 | 5/1980 | United Kingdom . | |

*Primary Examiner*—Anthony Bartis
*Attorney, Agent, or Firm*—Stevens, Davis, Miller & Mosher

[57] ABSTRACT

A portable electric battery operated hair curler having a handle detachable from a curling barrel provided with an electric heating element. The handle contains rechargeable batteries and a recharger, and has a first set of electrical connectors at its front end for mating with a set of electrical connectors at the back end of the curling barrel. The handle further includes a second pivotally mounted electrical connection means in the front end of the handle connected to the battery charger for connecting the charger to an external power source. The pivoted second connection is accessible for use only when the barrel is detached from the handle and is then movable from a stored position in the handle to a position projecting from one side of the handle for connection to the external power source.

5 Claims, 10 Drawing Sheets

Fig.4
Fig.5
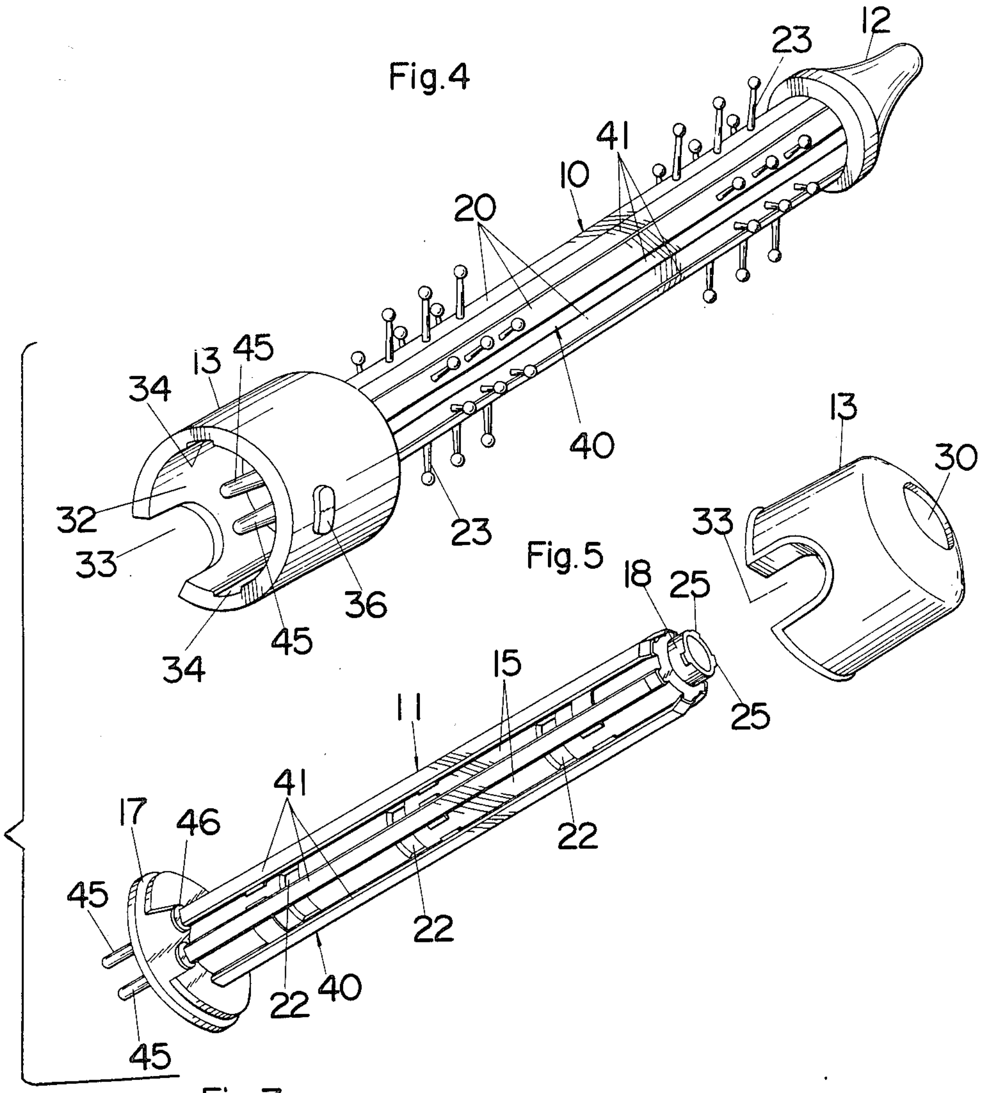
Fig.7
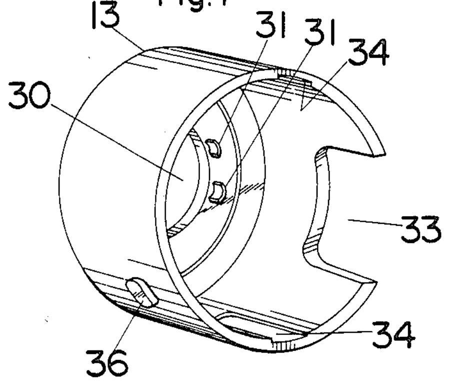
Fig.6
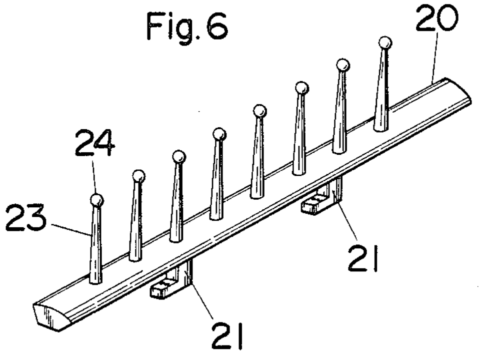

ELECTRIC HAIR CURLER WITH DETACHABLE HANDLE CONTAINING RECHARGEABLE BATTERIES AND CHARGER

This application is a division of U.S. Ser. No. 697,934 filed Feb. 4, 1985, now U.S. Pat. No. 4,641,010.

BACKGROUND OF THE INVENTION

1. Field of the Invention

The present invention is directed to a hair curler, and more particularly to a portable hair curler having a detachable barrel.

2. Description of the Prior Art

Electric hair curlers are well known in the art. One typical prior curler is shown in U.S. Pat. No. 4,329,567 in which an outer tube forms a barrel about which the hair is wound. An electric heater is received within an inner tube which is positioned within the outer tube and is in heat conducting relationship with the heater and the outer tube. Due to this structural restriction of enclosing the heater within the inner tube, a considerable amount of heat produced is absorbed in the inner and outer tubes. This is common to prior art curlers having the heater confined within the barrel. Although the above heat loss is not critical for the curlers with the heater relying upon the house current source from which the heater can get enough power to compensate the heat loss and well assure a desired hair curling treatment, it poses a serious problem when the curler is designed to employ a heater operating on a battery of less current capacity for portable use, in which case the heater is not expected to produce a sufficient amount of heat to compensate the above heat loss in the barrel, failing to give a desired curling effect on the hair wound on the barrel.

SUMMARY OF THE INVENTION

The present invention has been accomplished in view of the above and is so constructed as to assure a satisfactory curling or waving effect on the hair with the use of a portable hair curler operating on a battery or the like power source of less current capacity. The hair curler in accordance with the present invention comprises a detachable barrel provided with an electric heater for curling the hair wound on the barrel, and a handle supporting the barrel.

The barrel is detachably connected to the handle, and the handle has therein a pair of power supplying terminal slots. A pair of terminal pins which project from opposed resistor elements, in the heater element of the barrel, detachably fit into the terminal slots in the handle for electrical connection between a power source and the heater upon assembling of the barrel to the handle. Received in the front end portion of the handle is a charging circuit assembly interposed between the batteries and a plug block also received within the handle at the front most portion thereof. The plug block includes a pair of insertion blades which are plugged into a conventional electric outlet for charging the batteries through the charging circuit. The plug block is pivotally supported by the handle so that upon detachment of the barrel from the handle it is movable about a pivot axis between an erect position and a sideward projecting position, at the latter position, the insertion blades are preferred to be plugged into the electric outlet for recharging the batteries.

These and other advantageous features will become more apparent from the following detailed description of the embodiments when taken in conjunction with the accompanying drawings.

BRIEF DESCRIPTION OF THE DRAWINGS

FIG. 4 is a perspective view of a barrel employed in the above hair curler;

FIG. 5 is an exploded perspective view of the barrel;

FIG. 6 is a perspective view of a fillet to be secured to a core member of the above barrel;

FIG. 7 is a perspective view of a coupling cap to be secured to the rear end of the core member;

DESCRIPTION OF THE PREFERRED EMBODIMENTS

Figure 1:
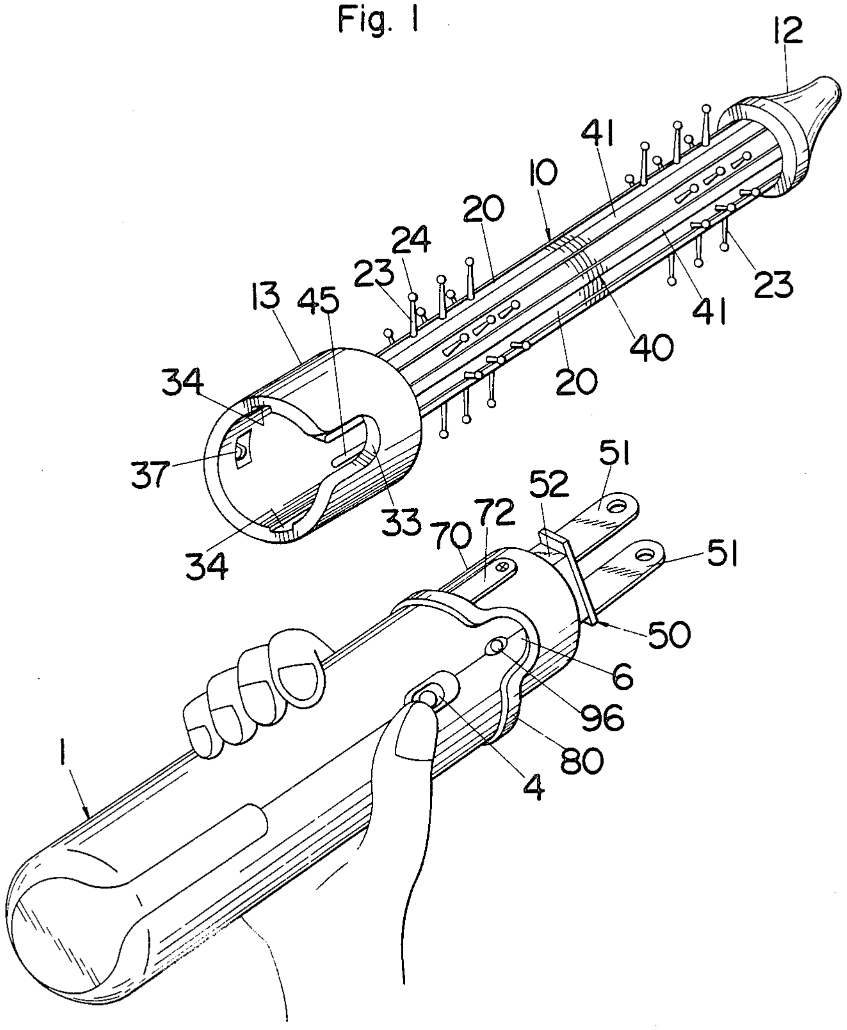
FIG. 1 is an exploded perspective view of a hair curler in accordance with a preferred embodiment of the present invention.
Figure 2:
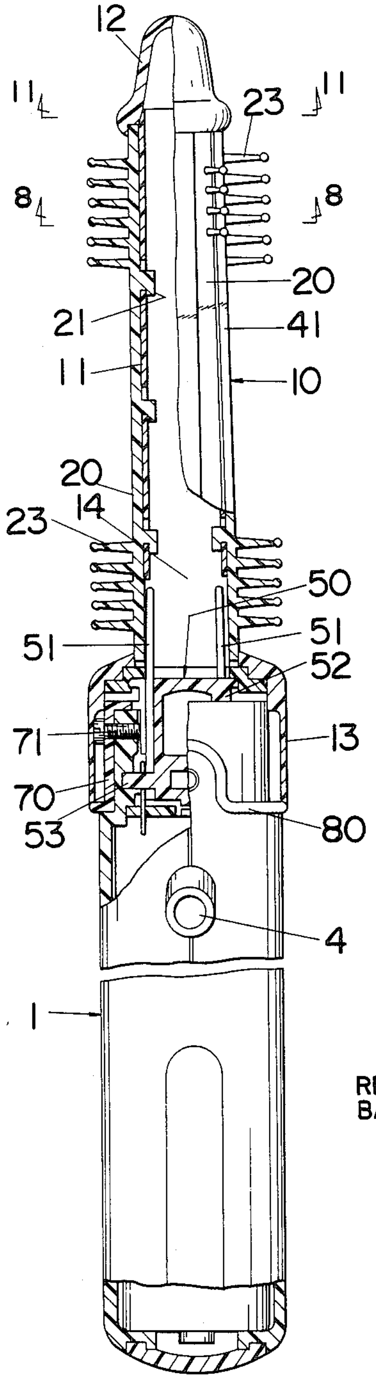
FIG. 2 is a front elevation partly in section of the above hair curler.
Figure 3:
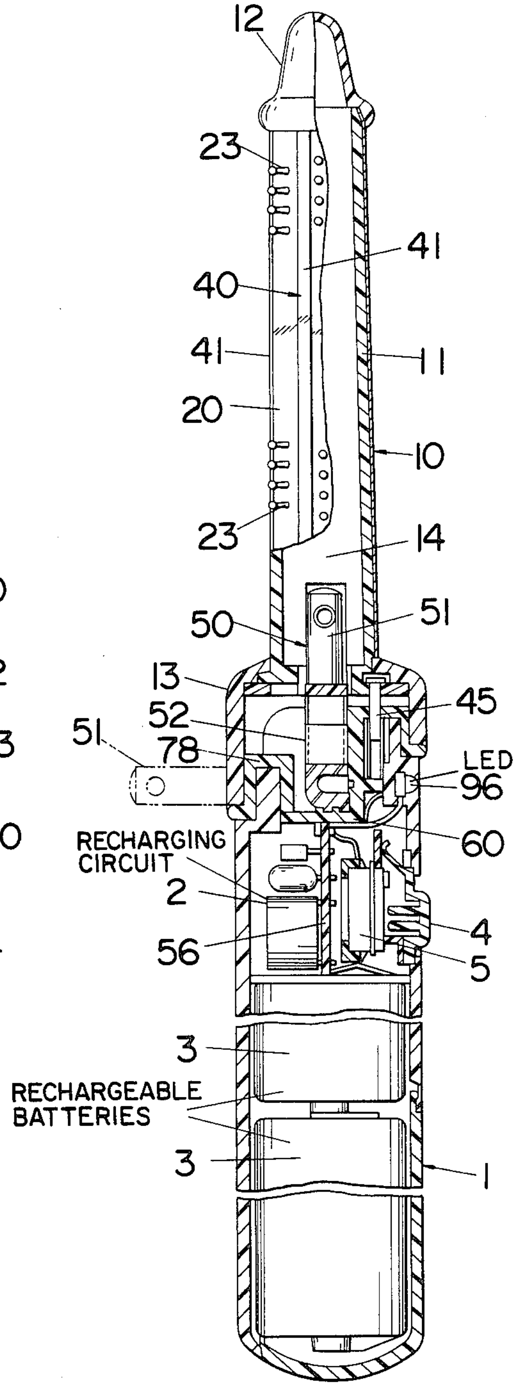
FIG. 3 is a side elevation partly in section of the above hair curler.

Referring now to FIGS. 1 to 3, a hair curler in accordance with a first preferred embodiment of the present invention comprises a handle 1 to be grasped by the hand of a user and a barrel 10 coaxially extending from the handle 1. The barrel 10 is detachably connected to the handle 1 and carries thereon an electric heater 40 which is energized by rechargeable batteries 3 incorporated in the handle 1 for curling the hair wound on the barrel 10. The handle 1 comprises a cylindrical housing within which the pair of rechargeable batteries 3 are received in tandem arrangement. Received in the front end portion of the handle 1 is a charging circuit assembly 2 interposed between the batteries 3 and a plug block 50 also received within the handle 1 at the frontmost portion thereof. The plug block 50 includes a pair of insertion blades 51 which are plugged into a conventional electric outlet 85 for charging the batteries 3 through the charging circuit. During the charging of the batteries 3, a light emitting diode (LED) 96 coupled with the charging circuit and seated in the sidewall of the handle 1 is energized to emit light for an indication purpose. The plug block 50 is pivotally supported by the handle 1 so that upon detachment of the barrel 10 from the handle 1 it is movable about a pivot axis between an erect position and a sideward projecting position, at the latter position, the insertion blades 51 are preferred to be plugged into the electric outlet 85. Mounted at a location rearwardly of the LED 96 is an on-off switch slide 4 which actuates an electric switch 5 inside the handle 1 for connecting the heater 40 to the batteries 3 and disconnecting it therefrom. The handle 1 has in its front end portion a pair of terminal slots 69 which are connected through the switch 5 to the batteries 3 and detachably receive complementary terminal pins 45 of the heater 40 projecting on the rear end of the barrel 10.

As shown in FIGS. 4 to 8, said barrel 10 comprises a core member 11 of plastic material of low thermal conductivity on which the heater 40 is mounted, a head cap 12 secured to the front end of the core member 11 to serve as a safety cool tip which may be supported by the other hand of the user during the hair curling process, and a joining cap 13 secured to the core member 11 to constitute means by which the barrel 10 is detachably connected to the front end of the handle 1. The core member 11 is an elongated tube member with an axial bore 14 and is formed in its outer surface with a plurality of circumferentially spaced channels 15 which extend along the entire length thereof to define between the adjacent ones of the channels 15 a corresponding number of elongated ridges 16. Integrally molded at the rear end of the core member 11 is an end plate 17 to which said joining cap 13 is secured such as by known ultrasonic welding technique. Also formed integral with the core member 11 is a post 18 projecting on the front end thereof for receiving thereon said head cap 12.

Figure 9:
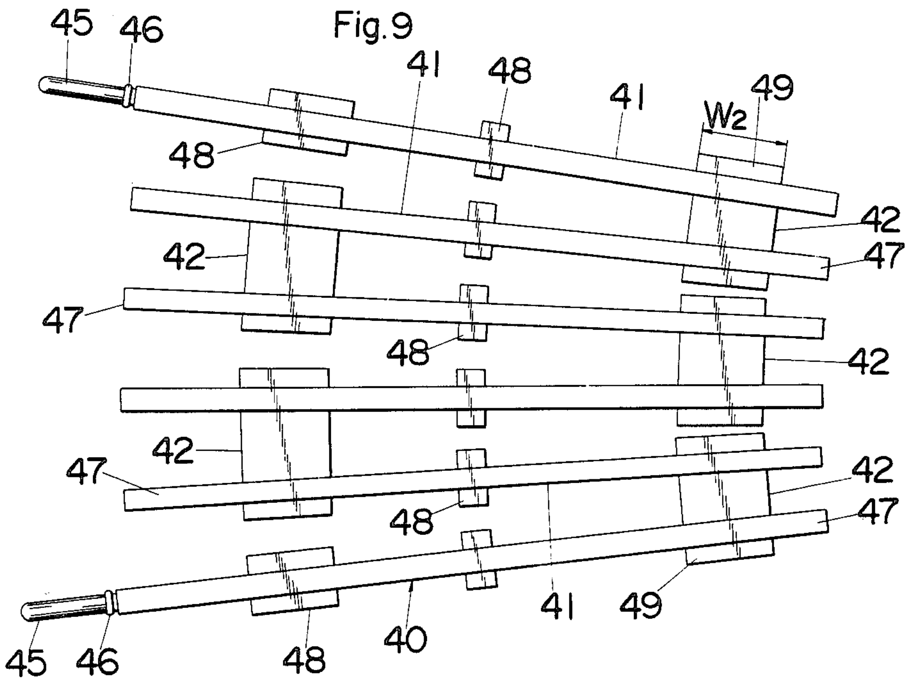
FIG. 9 is an expanded view of a heater to be mounted on the above barrel.
Figure 10:
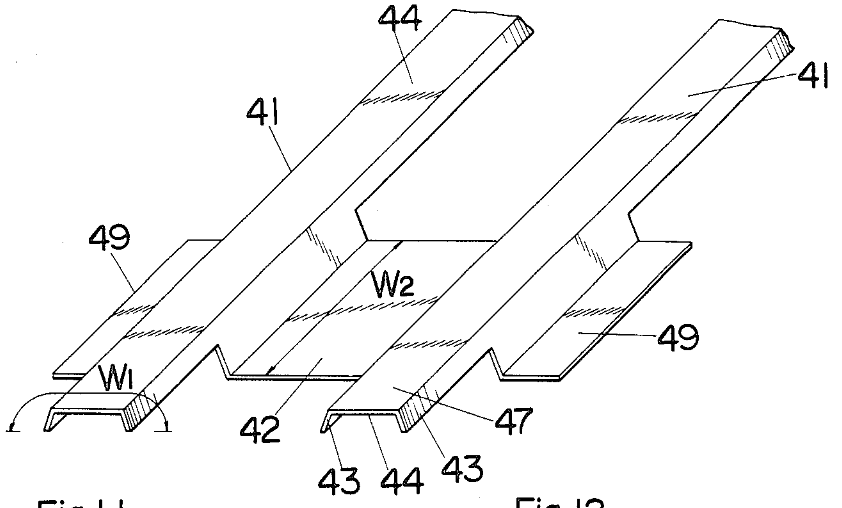
FIG. 10 is an enlarged perspective view of a portion of the above heater.

Referring to FIG. 9, the heater 40 is formed from a metal sheeting of relatively high electric resistance such as nickel-chromium steel and the like metal sheeting to have a plurality of resistor elements 41 in the form of strips extending along substantially the entire length of the barrel 10 in generally parallel relationship with one another and being integrally joined by a corresponding number of bridging segments 42. Each of the resistor elements 41 is shaped into a generally inverted U cross section with a pair of somewhat outwardly flaring legs 43 depending downwardly from the opposite sides of a web 44, as best shown in FIG. 10, and is connected at its one longitudinal end to the adjacent one of the resistor elements 41 by the bridging segment 42. This U-shaped cross section of the sistor element 41 is advantageous in that it has an increased strength against flexure along the length thereof, in addition to that the side edges of the web 44 of each resistor elements 41 to be exposed on the barrel 10 can be easily rounded at the time of shaping the heater 40, such rounded side edges of the web 44 of each resistor element 41 eliminating the possibility of injuring the skin of the user during the hair curling process with the hair curler of the present invention. Each bridging segment 42 is shaped into a generally U-shaped cross section having a pair of somewhat outwardly flaring legs which extend upwardly from the opposite sides of a web portion to join the corresponding legs 43 of the adjacent resistor elements 41. As shown in FIG. 9, the bridging segments 42 are staggered on opposite longitudinal ends of the heater 40, that is, staggered with respect to the adjacent ones so that the heater 40 includes a corresponding number of hair pin loops at the junctures of the bridging segments 42 with the resistor elements 41. Thus, the resistor elements 41 are serially connected by the bridging segments 42 in a zig-zag manner to have an elongated heating path.

Figure 8:
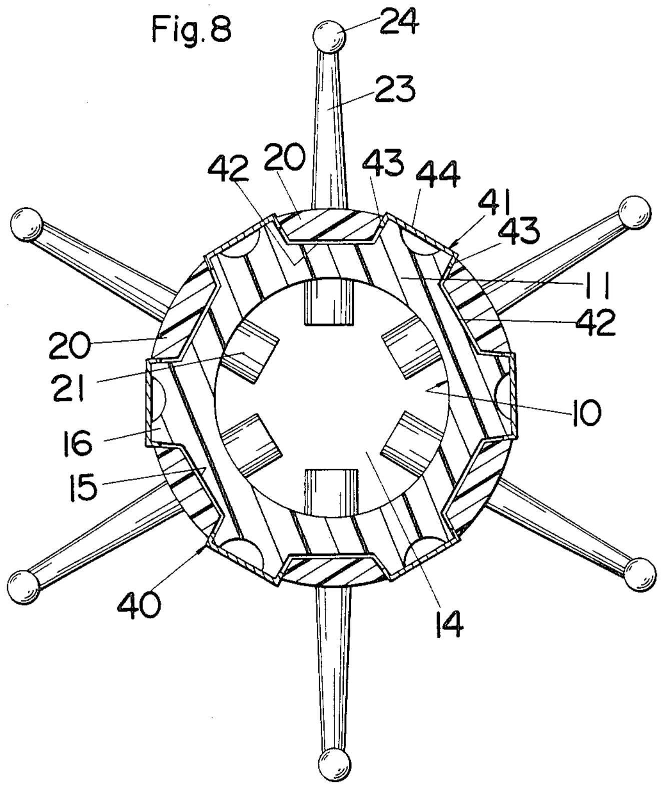
FIG. 8 is a cross section taken along line 8—8 of FIG. 2.

As shown in FIGS. 5 and 8, the heater 40 thus formed is wrapped on the core member 11 in such a way that the web 44 of each resistor element 41 covers each one of the ridges 16 of the core member 11 and at the same time that each bridging segment 42 is received in each one of the channels 15. Cooperative with the core member 11 are a plurality of elongated fillets 20 each of which is dimensioned to fit into the entire length of each channel 15 and is placed over the bridging segment 42 in the channel 15 so as to hold it therebetween. Each of the fillets 20 is secured to the core member 11 by means of hooks 21 projecting on the under surface thereof for engagement with corresponding perforations 22 formed in the bottom of each channel 15 of the core member 11. Also, the opposite ends of each fillet 20 are inserted respectively between the core member 11 and the head cap 12 and between the core member 11 and the joining cap 13 so as to be held therebetween. Each fillet 20 is made from a suitable plastic material to have an oblique sides which force the legs 43 of the resistor elements 41 together with those of the bridging segments 42 against the correspondingly configured sidewalls of the channels 15 for secure positioning of the heater 40 on the core member 11. In this way, the webs 44 of the resistor elements 41 are exposed on the outer surface of the barrel 10 to be in direct heat transfer contact with the hair to be wounded on the barrel 10. The fillets 20 are configured to have in their respective cross section arcuately curved upper surfaces which are cooperative to form a generally circular outer surface of the barrel 10. In this connection, said webs 44 of the resistor elements 41 project to a slight extent above the outer surfaces of the adjacent fillets 20, or the general outer surface of the barrel 10 for ensuring constant heat transfer contact between the hair and the heater 40. The edges on opposite sides of each web 44 are more or less rounded so as not to injure the skin of the user's head. Projecting on each fillet 20 are a series of longitudinally aligned bristles 23 with rounded tips 24 for adding a combing action to the hair curler.

In this embodiment, the resistor elements 41 and the bridging segments 42 are of the same thickness, or made from the sheeting of uniform thickness, however, the effective width $W_2$ with respect to the current flow direction of the bridging segment 42 is much larger than the effective width $W_1$ of the resistor element 41 so that the bridging segment 42 has a greater cross section and therefore much less electric resistance than the resistor element 41, whereby the resistor elements 41 alone can serve as a heating element while the bridging segments 42 to be hidden in the barrel 10 will not act as a heat source when subjected to the current. In other words, the bridging segments 42 can act only to pass the current and not to produce heat. Alternatively, the same effect can obtained by dimensioning the bridging segments 42 to have a greater thickness than the resistor elements 41.

Figure 12:
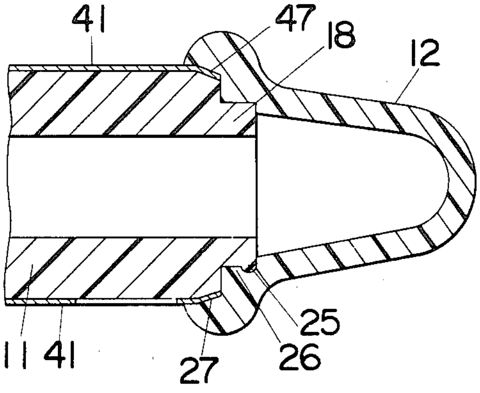
FIG. 12 is a sectional view taken along line 12—12 of FIG. 11.
Figure 17:
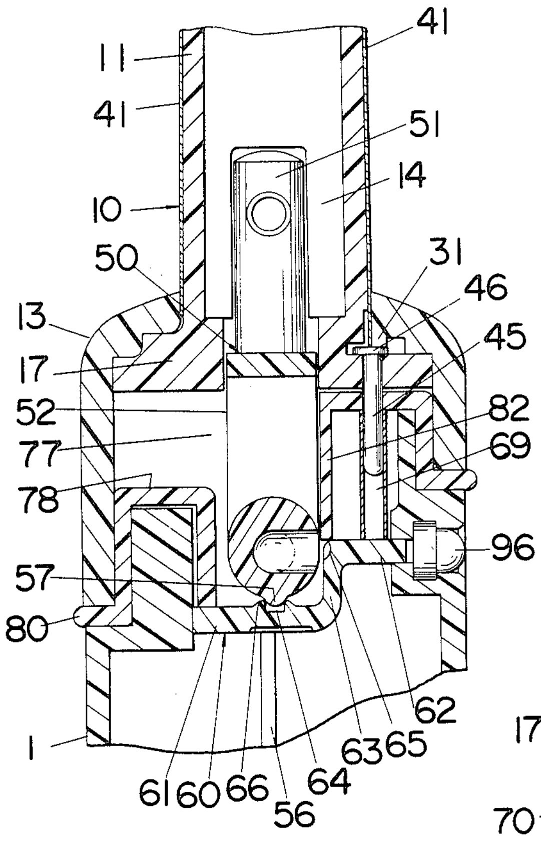
FIGS. 17 and 18 are fragmentary sectional views showing respectively in different sections the coupling portion between the handle and the barrel.

A pair of terminal pins 45 with flanges 46 are welded to the ends of the opposed resistor elements 41 and extend rearwardly through said end plate 17 with the flanges 46 abutting on the front surface thereof for connection with said pair of terminal slots 69 in the handle 1. Each of said bridging segments 42 join the adjacent resistor elements 41 at a point inwardly displaced longitudinally from the extreme end of each of those resistor elements 41 in order to leave at the extreme end portion of each resistor element 41 an ear or extension 47 which allows no current therethrough and therefore will not be self-heated upon energization of the heater 40. The ears 47 thus formed on both longitudinal ends of the heater 40 are fastened respectively on the opposite ends of the core member 11 by the help of said head cap 12 and joining cap 13. That is, the ears 47 on one end of the heater 40 are tightly held between the core member 11 and the head cap 12 as well as the ears 47 on the other end are likewise held between the core member 11 and the joining cap 13, as shown in FIGS. 12 and 17, respectively. Also formed integrally with each resistor elements 41 are side tabs 48 which project sidewards from opposite side edges or the legs 43 thereof at locations longitudinally spaced from the bridging segment 42. Further, each resistor element 41 is formed at the location corresponding to the bridging segment 42 with like tabs 49 projecting on the opposite side edge from the bridging segment 42. These tabs 48 and 49 are sandwiched together with said bridging segments 42 between the channels 15 and the fillets 20 for stably mounting the heater 40 on the barrel 10.

Figure 11:
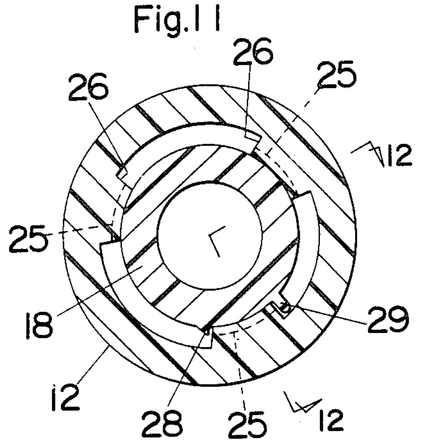
FIG. 11 is a sectional view taken along line 11—11 of FIG. 2.

Referring to FIGS. 11 and 12, said post 18 projecting on the front end of the core member 11 is formed at one extremity with shoulders 25 with which cooperative lugs 26 projecting radially inwardly of said head cap 12 are engaged respectively for fastening the head cap 12 to the core member 11. The shoulders 25 and the lugs 26 are evenly spaced circumferentially such that the lugs 26 are locked or retained behind the shoulders 25 by rotating the head cap 12 about the longitudinal axis of the core member 11 after passing the lugs 26 through the spacings between the adjacent shoulders 25. The head cap 12 defines on its inner periphery at the marginal portion rearwardly of the lug 26 a mating surface 27 which fits over the front end portion of the core member 11 so as to tightly hold said ears 47 of the heater 40 therebetween, as shown in FIG. 12. As the head cap 12 is fastened to the core member 11 by being rotated about the longitudinal axis of the core member 11, the ears 47 will not suffer any external force acting lengthwise on the resistor elements 41 at the time of fastening the head cap 12 on the core member 11, thus preventing lengthwise deformation of the resistor elements 41 and ensuring exact positioning of the heater 40 on the barrel 10. As shown in FIG. 11, the post 18 has a detent 28 and a stop 29 at portions adjacent the opposite circumferential ends of one of the shoulders 25 and slightly spaced rearwardly therefrom. Upon rotation of the head cap 12 on the post 18, one of said lugs 26 will cam over the detent 28, riding up the incline of the detent 28 so as to be locked between the detent 28 and the stop 29, in which position the cap member 12 is unrotatably locked to the core member 11.

Said joining cap 13 has in its front wall a center hole 30 through which the rear end of the core member 11 extends with the end plate 17 engaged with the interior surface of the front wall, as best shown in FIG. 17, and is secured to the core member 11 by welding together the end plate 17 and the front wall of the joining cap 13. Inserted into the hole 30 together with the rear end of the core member 11 are said ears 47 on the rear ends of the resistor elements 41 to be tightly held between the periphery of the hole 30 and the core member 11. Thus, the resistor elements 41 of the heater 40 are secured to both longitudinal ends of the core member 11. As shown in FIG. 7, the joining cap 13 is formed on its interior surface at positions adjacent the periphery of said hole 30 with a pair of integral tags 31 which project rearwardly to press the flanges 47 of said terminal pins 45 against the end plate 17 for securely holding the terminal pins 45 in position. The rear portion of the joining cap 13 defines therein an opening 32 into which a nose piece 70 fixed to the front end of the handle 1 extends for detachable connection between the barrel 10 and the handle 1. The joining cap 13 has in its side wall a notched portion 33 which opens rearwardly to receive therein a prong 6 on the front portion of the handle 1 for establishing a correctly oriented connection between the handle 1 and the barrel 10.

Figure 14:
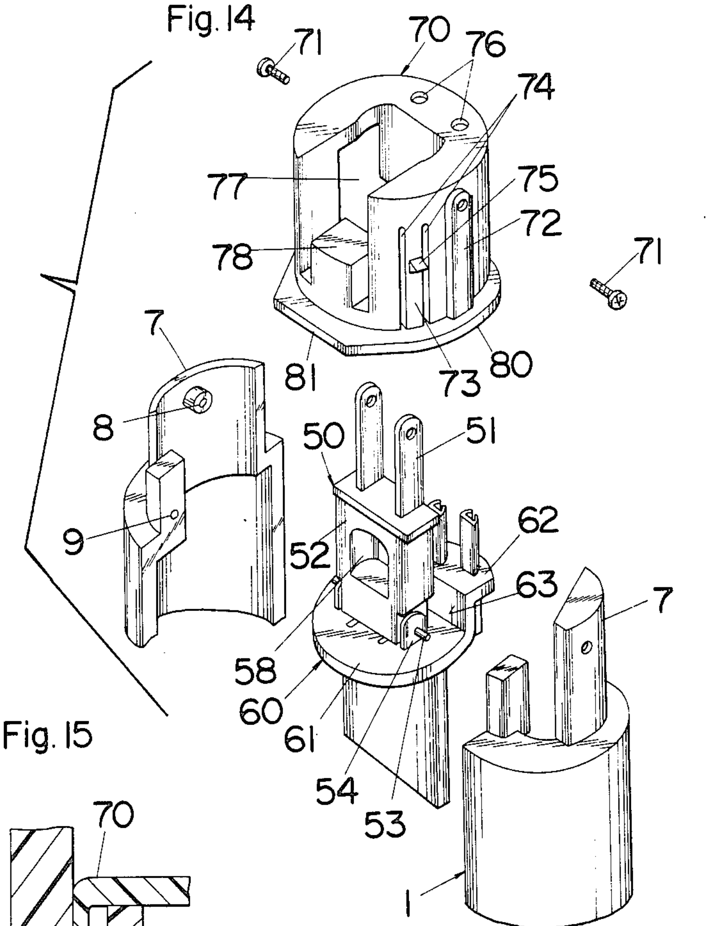
FIG. 14 is an exploded perspective view showing several parts forming the coupling end of a handle to which the above barrel is connected.
Figure 15:
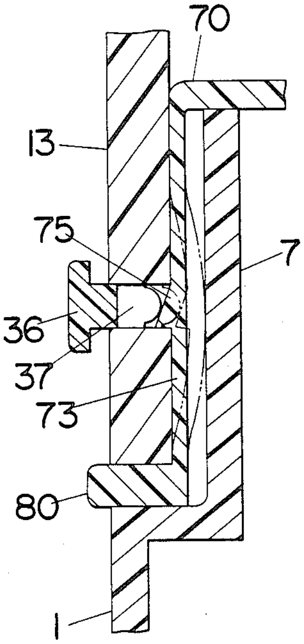
FIG. 15 is a fragmentary view showing in longitudinal section a detachable coupling structure between the handle and the barrel.
Figure 16:
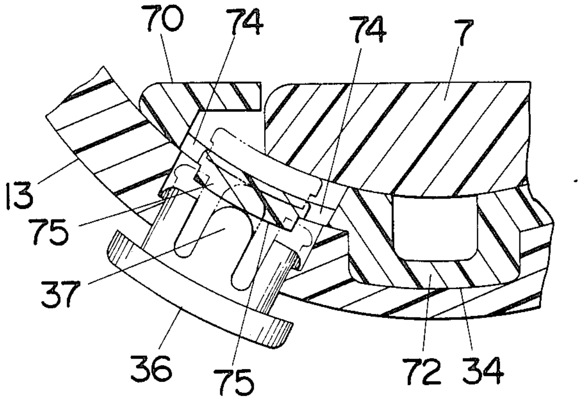
FIG. 16 is a fragmentary view showing in transverse section the detachable coupling structure between the handle and the barrel.

As shown in FIG. 14, the housing of the handle 1 comprises a pair of halves provided at their front end with an axially projecting integral tangs 7 which are inserted in the nose piece 70 to be secured thereto and at the same time to be held together by means of screws 71 extending from the side wall of the nose piece 70 into apertures 8 in the respective tangs 7. Projecting on the sidewall of the nose piece 40 are a pair of diametrically opposed guides 72 which extend longitudinally so as to be slid into corresponding grooves 34 formed in the inner surface of said joining cap 13. Also formed in the sidewall of the nose piece 70 adjacent and parallel to one of the guides 72 is a bow segment 73 which is defined between a pair of parallel slits 74 and is thin-walled so that it is capable of being resiliently flexed radially inwardly, as indicated by dotted lines in FIG. 15. The bow segment 73 carries on its outer surface intermediate its ends a latch 75 which snaps into an eyelet 35 in the joining cap 13 after being resiliently flexed inwardly, as indicated by dotted lines in FIG. 16, for connection between the handle 1 and the barrel 10. A release button 36 is provided on the joining cap 13 with its actuator leg 37 extending into the eyelet 35 for engageable contact with the latch 75 so that the release button 36 disengages the latch 75 from the eyelet 35 when pressed by the finger of the user, detaching the barrel 10 from the handle 1. A pair of ports 76 are provided in the front end wall of the nose piece 70 for guiding the terminal pins 47 into the terminal slots 69 inside the the handle 1. The nose piece 70 is configured to have a cavity 77 which opens at both front and rear ends as well as opens sideward through a recessed portion in the side wall thereof. It is within this cavity 77 that said plug block 50 is received with the insertion blades 51 projecting outwardly from the nose piece 70.

Figure 18:
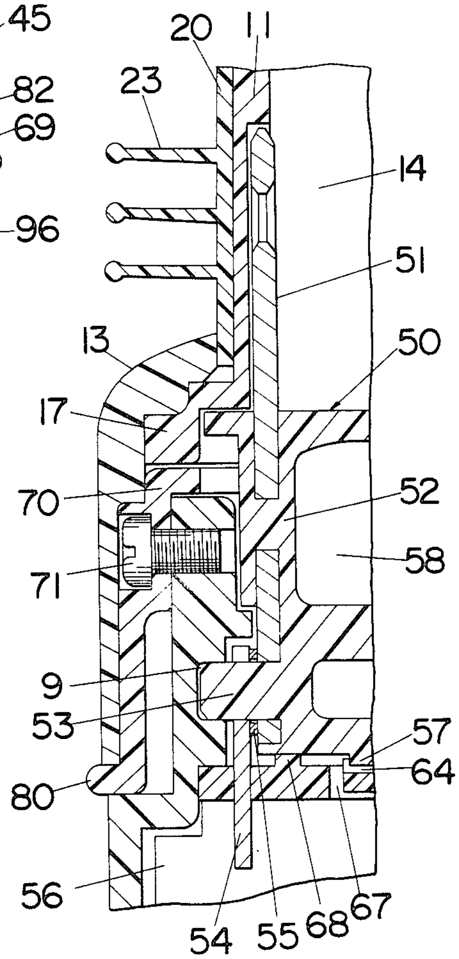
Figure 19:
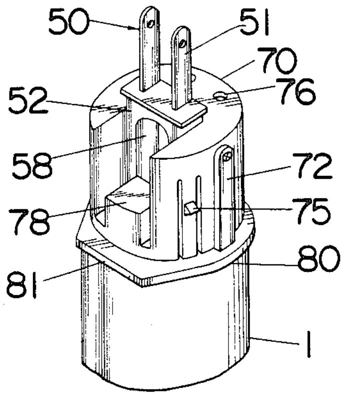
FIGS. 19 and 20 are perspective views of the coupling end portion of the handle respectively with its plug block in an erect position for coupling with the barrel and in a sideward projecting position for connection with a conventional electrical outlet.
Figure 20:
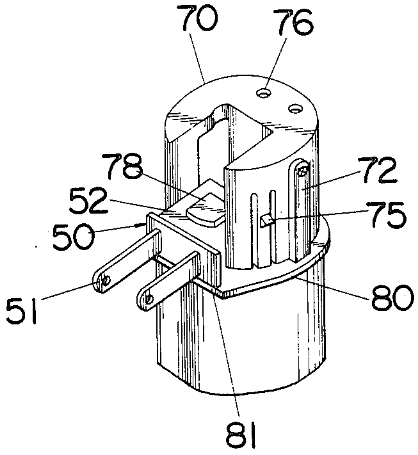
Figure 21:
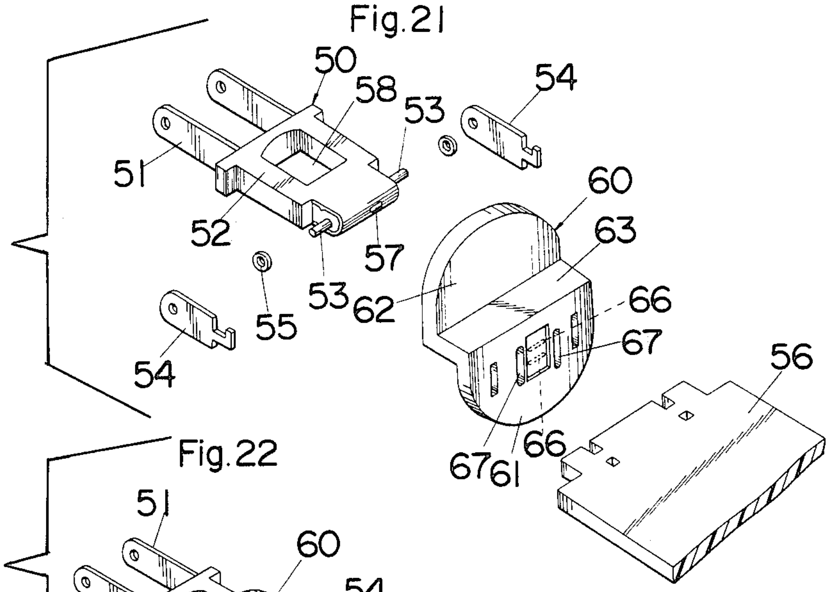
FIG. 21 is an exploded perspective view of the above plug block connected with a printed circuit board mounting thereon a charging circuit.
Figure 22:
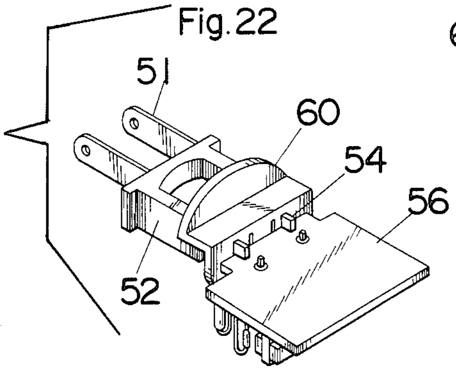
FIG. 22 is a perspective view of the above plug block.
Figure 23:
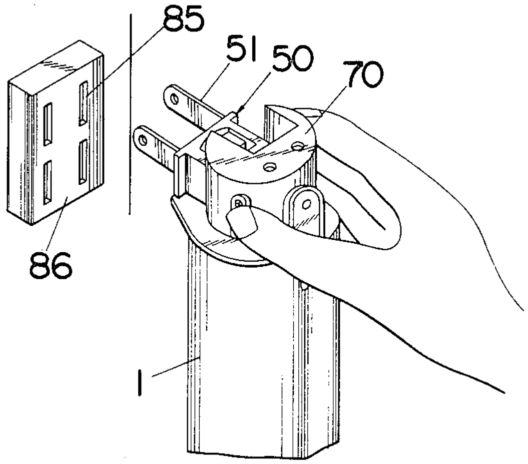
FIG. 23 is a perspective view of the above plug in the projecting position for connection with a wall outlet.

The plug block 50 indicates an insulation base 52 of plastic material from which said insertion blades 51 extends. Projecting integrally on rearward sides of the insulation base 52 are a pair of oppositely extending studs 53 which are journaled respectively in bearing holes 9 formed in the front end portions of the handle 1 to define the pivot axis of the plug block 50. Thus, the plug block 50 is pivotally supported in the front portion of the handle 1 to be movable between the erect position where the insertion blades 51 project forwardly into the axial bore 14 of the barrel 10, as shown in FIGS. 17, 18 and 19, and the sideward projecting position where the blades 51 project sideward for being plugged into the conventional a.c. outlet 85 of an ordinary house current source as shown in FIGS. 20 and 23. Each of the studs 53 defining the pivot axis extends outwardly through the rear end portion of each blade 51 exposed on the side of the insulation base 52 and further extends loosely through each one of a pair of brackets 54. The brackets 54 are made of electrically conductive material and are electrically connected respectively to the blades 51 through wave washers 55 also carried on the studs 53, each washer 55 being kept in contact with the exposed portion of the blade 51 and the bracket 54. The brackets 54 extend rearwardly through a backing plate 60 and are connected at their rear ends mechanically to a printed board 56 to be supported thereby and at the same time connected electrically to the charging circuit mounted on the printed board 56. Thus, the charging circuit assembly 2 and the plug block 50 are assembled into a single unit. The backing plate 60 is adapted to close the rear opening of the nose piece 70 and comprises first and second sections 61 and 62 which lie within different but parallel planes and integrally connected by an upright section 63, the first section 61 forming with the upright section 63 an inside corner at which the rear end of the insulation base 52 is situated, as best shown in FIG. 17. A click projection 57 on the rear end of the insulation base 52 is clicked into a first recess 64 formed in the first section 61 when the plug block 50 is in the erect position and into a second recess 65 formed in the upright section 63 for stably holding the plug block 50 in the respective positions. The first recess 64 is defined between a pair of nubs 66 on the first section 61 at the region which is thin-walled and enclosed between a pair of slits 67, so that the region can be resiliently deformed at the time of the projection 57 riding up the nub 66, ensuring reliable latching action at the first recess 64 when the plug block 50 moved from the erect position to the sideward projecting position. The second section 62 carries thereon members which form said terminal slots 69 for receiving the terminal pins 47 of the heater 40 and are electrically connected to the batteries 3 through the switch 5.

The insulation base 52 has a window 58 into which a boss 78 of the nose piece 70 fits when the plug block 50 is in the sideward projecting position, as shown in FIG. 20, at which position the leading edge of the insulation base 52 is aligned with a straight edge portion 81 of a rim 80 projecting around the rear end of the nose piece 70 and forms therewith a stable abutting end against the face plate 86 of the outlet 85. The guides 72 projecting on the nose piece 70 are utilized as grips for facilitating plug-in operation of the blades 51 into the outlet 85 by the fingers of the user, as shown in FIG. 23. At this plug-in operation, the rear end of the insulation base 52 abuts against the upright section 63 of the backing plate 60 and against a stop wall 82 depending from the front face of the noise piece 70 so as to be supported thereby, eliminating the stress concentration to the studs 53 or the pivot axis of the plug block 50. Said straight edge portion 81 also serves as a stand when the hair curler is placed on a table. When unplugging the blades 51 from the outlet 85, the rear edge of the boss 78 firstly engages the rear edge of the window 58 so as to alleviate the stress concentration to the pivot axis 53. The insertion blades 51 may be plugged into the outlet 85 even when the plug block 50 is in the erect position, at which condition, the rear end of the insulation base 52 is supported by a pair of projections 68, only one of which is shown in FIG. 18, formed on the first section 61 of the backing plate 60 on both sides of said slits 67. Therefore, the stress concentration to the pivot axis 53 can be alleviated also in this mode of use.

Figure 13:
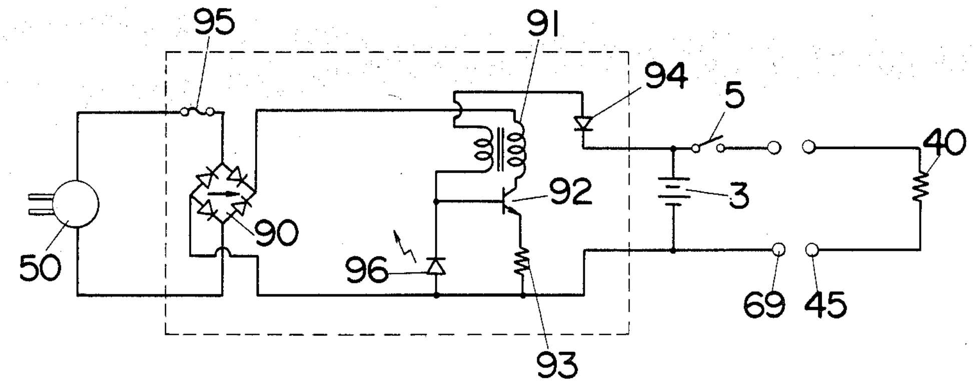
FIG. 13 is a circuit diagram of the above hair curler.

FIG. 13 shows the circuit diagram of the charging circuit mounted on the printed board 56 which is electrically connected between the blades 51 of the plug block 50 and the rechargeable batteries 3. The circuit includes diode-bridge 90, pulse transformer 91, switching transistor 92, resistor 93, diode rectifier 94, fuse 95, and said LED 96 which emits light during the charging of the batteries 3 and during the energizing of the heater 40, said diode rectifier 94 being responsible for preventing reverse current flow from the batteries 3 to the charging circuit.

Figure 24:
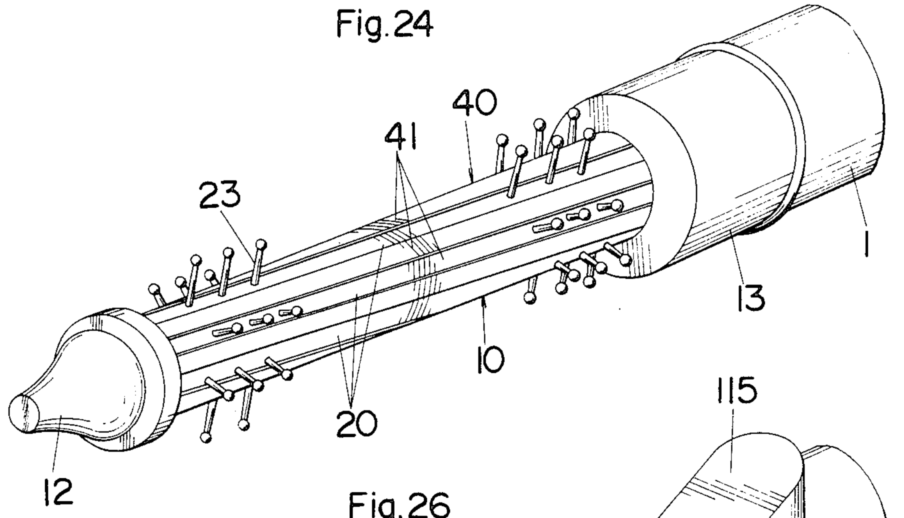
FIGS. 24 and 25 are fragmentary perspective views respectively of modifications of the above embodiment.

Referring to FIG. 24, there is shown a modification of the above embodiment which is similar in construction to the above embodiment except that the resistor elements 41 of the heater 40 and the fillets 20 extend obliquely with respect to the longitudinal axis of the barrel 10.

Figure 25:
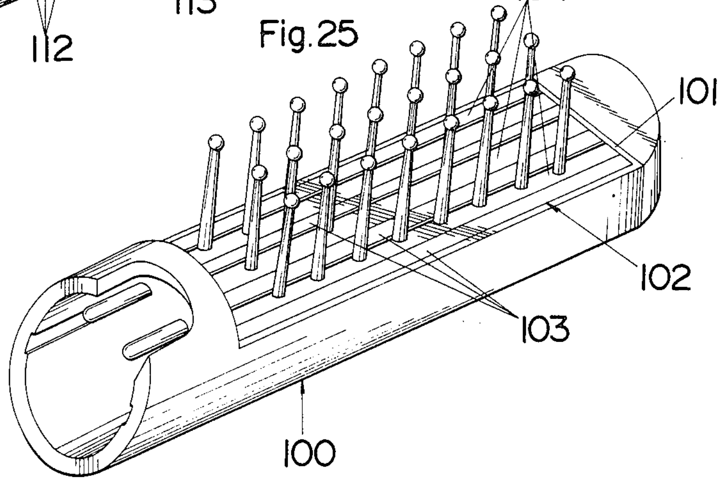

FIG. 25 shows another modification of the above first embodiment which is similar in construction thereto except that a barrel 100 is shaped into different configuration somewhat resembling a hair brush. The barrel 100 is formed with a flat and generally rectangular outer surface 101 on which is mounted a heater 102 of like construction as in the above embodiment. The heater 102 includes like resistor elements 103 extending longitudinally in parallel relation and alternated transversely by like fillets 104 with bristles 105.

Figure 26:
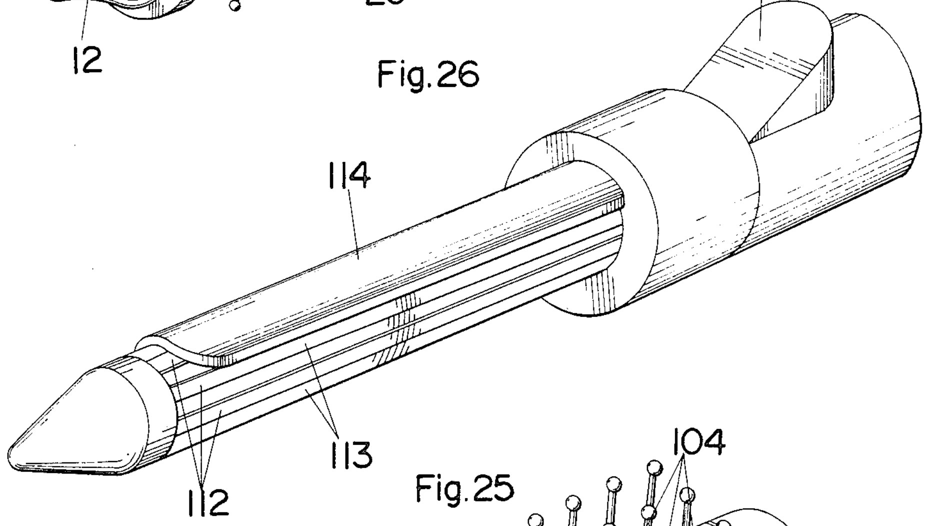
FIG. 26 is a fragmentary view of a hair curler in accordance with another embodiment of the present invention.

Another preferred embodiment of the present invention is shown in FIG. 26. The hair curler of the present embodiment includes a hair clamping tongue 114 pivotally connected to a barrel 110 which is identical to that of the first embodiment except that the fillets 113 have no bristles. That is, the heater 111 mounted on the barrel 110 includes like resistor elements 112 alternated by the fillets 113. The clamping tongue 114 is moved away from the barrel 110 by pressing a thumb button 115 at the rear end thereof for introducing the hair around the barrel 110. The thumb button 115 also serves as an on-off switch button of the heater 111 as it is designed to turn on a power switch inside the handle 116 by being pressed and the power switch is kept closed until the thumb button 115 is again pressed for unwinding the hair.

What is claimed is:

1. A hair curler comprising, an elongated barrel having a front end, a rear end and an electrical heater for curling hair wound thereon;

a detachable handle having a front end detachably connected to the rear end of said barrel for supporting the barrel;

said electrical heater of said barrel having first electrical connection means at the rear end of said barrel which is adapted to detachably connect with first cooperating electrical connection means in the front end of said handle;

the handle having rechargeable electric battery means connected to said first cooperating electrical connection means for supplying current to the heater and a battery charger carried by said handle and connected to said battery means for charging the battery means;

the handle further having second electrical connection means, in the front end of said handle and connected to said battery charger for connecting the charger to an external source of power, and being accessible only when the handle is detached from the barrel, said second electrical connection means being movable from a first position where it projects from one side of the handle, when said handle is detached from said barrel, to a second position where it is stored within the handle when the handle is supporting the barrel.

2. The hair curler of claim 1, in which the second connector means comprises a pair of insertion blades of a configuration to plug into an electrical outlet when in its first position.

3. The hair curler of claim 2, in which the pair of insertion blades is pivotally mounted to move from said first position to said second position.

4. The hair curler of claim 1, in which said first electrical connection means is a pair of projecting male contacts on the rear end of said barrel and said first cooperating electrical connection means on the handle is a pair of female terminals on the front end of said handle.

5. The hair curler of claim 1. wherein said second electrical connection means is pivotably mounted and is movable from said first position where it projects from one side of the handle when said handle is detached from the barrel to said second position where it is stored within the handle when the handle is supporting the barrel.

* * * * *